United States Patent
Egan et al.

(10) Patent No.: US 9,652,762 B2
(45) Date of Patent: May 16, 2017

(54) PROXIMITY-BASED TRANSACTION DEVICE SELECTION

(71) Applicants: Greg Scott Egan, Flowery Branch, GA (US); Gregory James Sirmans, Cumming, GA (US); Matthew Phillip Kamp, Cumming, GA (US)

(72) Inventors: Greg Scott Egan, Flowery Branch, GA (US); Gregory James Sirmans, Cumming, GA (US); Matthew Phillip Kamp, Cumming, GA (US)

(73) Assignee: NCR Corporation, Duluth, GA (US)

( * ) Notice: Subject to any disclaimer, the term of this patent is extended or adjusted under 35 U.S.C. 154(b) by 120 days.

(21) Appl. No.: 14/472,848

(22) Filed: Aug. 29, 2014

(65) Prior Publication Data

US 2016/0063477 A1    Mar. 3, 2016

(51) Int. Cl.
H04W 4/02     (2009.01)
G06Q 20/32    (2012.01)
H04M 1/725    (2006.01)

(52) U.S. Cl.
CPC ....... *G06Q 20/327* (2013.01); *G06Q 20/3224* (2013.01); *H04M 1/7253* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 9,230,272 B1 * | 1/2016 | Eramian | G06Q 30/0281 |
| 2015/0332240 A1 * | 11/2015 | Harwood | G06Q 20/202 705/21 |
| 2015/0332248 A1 * | 11/2015 | Weksler | G06Q 20/3226 705/71 |

* cited by examiner

*Primary Examiner* — Quan M Hua
(74) *Attorney, Agent, or Firm* — Schwegman, Lundberg & Woessner; Paul W. Martin

(57) ABSTRACT

Various embodiments herein each include at least one of systems, methods, software, and devices for proximity-based transaction device selection. One embodiment in the form of a method performed on a mobile device includes receiving a positioning signal and identifying a terminal associated with the positioning signal. An instruction may then be transmitted to the identified terminal via a wireless data communication device of the mobile device.

7 Claims, 3 Drawing Sheets

PROXIMITY-BASED TRANSACTION DEVICE SELECTION

BACKGROUND INFORMATION

Most businesses, such as retail stores, restaurants, and other consumer outlets, strive to make their payment transaction processes easy and convenient for customers and cashiers. To these ends, businesses have started providing mobile computing devices, such as tablets including payment transaction processing apps, to their personnel for use in entering products and services to be purchased. Some such mobile devices include payment card readers and the payment transaction processing apps that may leverage a camera of the mobile device to scan product barcodes. However, mobile devices are limited from performing certain functions that can be performed at more typical checkout stations, such as printing a receipt and receiving cash and check payments as mobile devices typically do not include a printer or a cash drawer.

To overcome these mobile device shortcomings in retail environments, solutions have come to market that allow certain payment transaction processing functions to be sent to more conventional terminals, such as checkout stations, that include various peripheral devices supporting the desired functions. However, these solutions involve risk and inconvenience. For example, when the unsupported function of the mobile device is receipt of a cash payment, the mobile device app may allow the clerk to open a cash drawer of a terminal. The cash drawer may be located in a distant store location from the clerk. If the cash drawer is opened when the clerk is not present at the site of the cash drawer, cash held in the drawer becomes unsecure and is subject to easy theft. Further, when the unsupported mobile device function is the printing of a receipt and a terminal to which the receipt printing function is sent is not close, retrieving the receipt may be inconvenient for both the clerk and customer, thereby defeating the purpose of mobile device usage in making payment transaction processes convenient.

SUMMARY

Various embodiments herein each include at least one of systems, methods, software, and devices for proximity-based transaction device selection.

One embodiment in the form of a method performed on a mobile device includes receiving a positioning signal and identifying a terminal associated with the positioning signal. An instruction may then be transmitted to the identified terminal via a wireless data communication device of the mobile device.

Another method embodiment includes identifying a terminal associated with a positioning signal received via at least one transceiver device of the computing device and transmitting, via at least one transceiver device to the identified terminal, an instruction for the identified terminal to perform a data processing task related to a payment transaction initiated with an application that executes on a device performing the method.

A further embodiment is a mobile device. The mobile device includes at least one data communication transceiver device, at least one processor and at least one memory device. The memory device stores instructions executable by the at least one processor to process a positioning signal received via at least one data communication transceiver device to identify at least one terminal associated with the positioning signal. The instructions are further executable to receive user input into and provide a view on a display of the mobile device with regard to a payment transaction initiated thereon. The mobile device may further receive an input command to perform a payment transaction function that is not supported on the mobile device but is supported on the identified terminal. The instructions are further executable in such circumstances to transmit a command and any data for performance of the command via the data communication transceiver device to the identified terminal.

DETAILED DESCRIPTION

Figure 1:
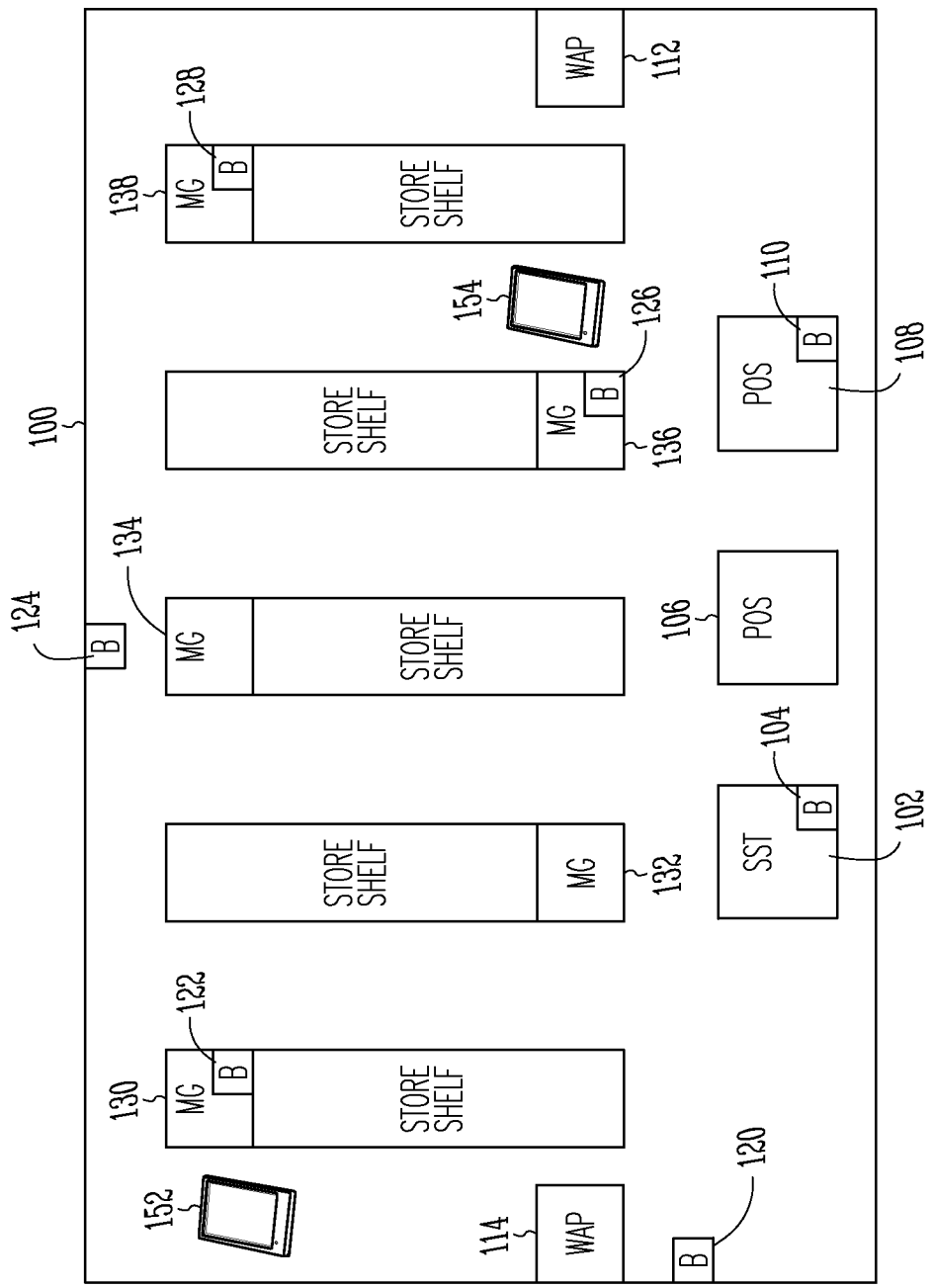
FIG. 1 is a map of devices and system components deployed in retail environment, according to an example embodiment.

Various embodiments herein each include at least one of systems, methods, software, and devices for proximity-based transaction device selection. The various embodiments described herein are described primarily in the context of payment transactions. However, some embodiments may be implemented in other contexts. Such other contexts may include airport check in and choosing a printer on which to print a boarding pass, gift registry where there are no payments made, library item checkout, facility monitoring such as for locking and unlocking doors and lockers or adjusting lighting or heating, ventilation, and cooling systems, and the like. The basic premise of some embodiments is filtering options presented on mobile devices through identification of devices proximately located to a mobile device.

For example, some such embodiments enable clerks, waiters, and other personnel utilizing mobile devices to assist customers during a checkout process to access devices coupled to terminals to perform payment transaction processing functions that are unsupported by the mobile devices. In other embodiments, a customer may utilize their own mobile device, such as a tablet or smartphone with a mobile device app, to perform a portion of a payment transaction process and complete the payment transaction process by transmitting data to a terminal that supports a function that is unsupported by the customer mobile device (e.g., print a receipt) or the customer is not permitted to perform via the mobile device or the app (e.g., make a cash payment and make change from a cash drawer).

In facility monitoring context, facility monitoring personnel may be provided options for locking and unlocking doors located only in a proximate location of a mobile device of a security guard. Similarly, in a library item checkout context, a patron may be provided with options to checkout items in part by scanning item barcodes on their mobile device and then be presented with an option to select a self-service checkout station on which to complete the item checkout process that is proximately located with regard to the patron.

However, as mentioned above, the embodiments described herein are described primarily in the context of payment transactions. However, the basic premise of some embodiments in filtering options presented on mobile devices through identification of devices proximately located to a mobile device is equally applicable and beneficial in many other contexts.

Some such embodiments are enabled by a positioning solution deployed within a facility, such as a store, restaurant, library, prison or jail, other facility, park, yard, and the like. A positioning system may include one or more devices that broadcast signals that are received by mobile devices. In some embodiments, positioning system devices may broadcast a radio signal that includes data encoded therein. The encoded data may be an identifier of the positioning device that broadcast the signal. The identifier may be used as an index to obtain positioning data, data identifying one or more terminals, or other data that may be used to identify a terminal in proximity to the positioning device that broadcast the received signal. The positioning data may be obtained from data stored on the mobile device or as may be accessible via a wireless connection of the mobile device from another device, such as a server or cloud-based web service. In other embodiments, a signal broadcast by a positioning system device may include positioning data that indicates a position, can be used to determine a position or identifies one or more terminals within proximity of the broadcasting device. Some such embodiments may also utilize a strength of a received signal to determine, or assume based on a threshold signal strength configuration, a distance of the mobile device from a positioning system device. Due to the nature of signaling, such as radio frequency signaling, a determined distance is typically not an actual distance, but rather a relative or approximate distance between a mobile device and a positioning system device. Thus, a distance may be assumed based on the strength of signal in view of one or more signal strength thresholds of a process that identifies terminals proximately located to a mobile device.

The positioning system devices, in some embodiments, may include a radio transceiver device, such as a Bluetooth® beacon device. Among others, such beacon devices as are available from NCR Corporation of Duluth, Ga. among other manufacturers. The positioning system devices may also or alternatively include Wi-Fi® wireless Access Point (WAP) devices in some embodiments. In other embodiments, the positioning system devices may broadcast one or more of ultrasonic and light-based signals that are imperceptible to humans.

The positioning system devices may be standalone devices, integrated within another device or terminal, such as checkout stations, point-of-sale (POS) terminals, Self-Service Terminals (SSTs) (e.g., self-service checkout stations, computer-enabled kiosks, Automated Teller Machines (ATMs)), and the like.

In some other embodiments, rather than relying upon a positioning system deployed within a facility, a mobile device app may obtain positioning data from a Global Positioning System (GPS) device present on the mobile device, a positioning service accessible via a network such as the Internet that determiners mobile device position based on one or more of wireless network towers and wireless access points to which the mobile device is connected to, or a combination of such solutions. However, knowledge of an exact position or knowing a position of the mobile device is not necessary in all embodiments. The goal of the positioning solution is instead to provide a mobile device app with information identifying terminals in proximity to the mobile device that support payment transaction functions that are unsupported on the mobile device. While an exact position may be used to identify such terminals, knowledge of a positioning system device within a certain radius of the mobile device can be sufficient in some embodiments in view of data that identifies terminals in proximity to the positioning system device. In some embodiments, identities of those terminals may be found in a lookup table or other data structure that associates terminals with an identifier of a positioning system device from which the mobile device receives a signal. In other embodiments, the positioning system device may broadcast one or more signals that include encoded data identifying the terminals.

As strength of signals between mobile devices and positing system devices may be affected by distance, signal strength may be used in some embodiments to further refine proximate positioning of a mobile device in relation to positing system devices and one or more terminals. However, signal strength may also be affected by environmental variables. As such, some signal strength positing embodiments may include configurable options that may be specific to an installed positioning system or with regard to specific positioning system devices thereof.

Through such embodiments, a payment transaction process device is able to identify one or more terminals that are available not only for use, but for convenience, security, and productivity purposes. A clerk, customer, or other user may be presented with an option to choose a terminal to utilize in completing a transaction with tasks such as receipt printing, providing cash, check, or gift certificate payments, verifying an identity to purchase a controlled good (e.g., tobacco, alcohol, and certain pharmaceutical products), and other tasks. Some embodiments, when presenting the clerk, customer, or other user with the option to choose a terminal include presenting terminal options with regard to only certain terminals, such as terminals that are currently online, terminals that are not in use by others, only terminals capable of performing all needed functions to complete the transaction, and the like.

Some embodiments also provide an ability for a customer, clerk, or other personnel to start a payment transaction process on a mobile device, also referred to as pre-staging a transaction, and to transfer the pre-staged transaction to a terminal, such as a checkout station. There are many use cases for pre-staged transactions, such as a customer scanning products as they are added to a cart and pre-staging the transaction to make the checkout process faster, clerks scanning customer selected products while waiting in line at a checkout station attended to by another clerk during peak customer periods, among others.

When a payment transaction process is at a point where the user desires to pre-stage and transfer the transaction, a mobile device app option may be user selected and the terminal to which the transaction automatically determined based on proximity determination as discussed above and elsewhere herein. In other embodiments, a plurality of options may be determined and presented to the user for selection.

In some other embodiments, a transaction may also be transferred from a terminal to a mobile device. For example, while at a terminal, the customer may have questions with regard to a product or a product price check may need to be performed. In such instances, an option may be presented to choose from one or more mobile devices that are proximately located to either the terminal or to a certain location in a store, such as close to a shelf location where the product in need of a price check is stored. In such embodiments, mobile devices of personnel moving about the store may periodically report their determined proximate positions to a store management system or the terminal may transmit a query to mobile devices in the store that are proximately located to the needed location. In other embodiments, positioning system devices may identify devices within which they are communicating. This data may then be used to not only report locations to the store management system, but also or alternatively, in some embodiments, to provide data from which mobile device apps may base presented terminal options. In such embodiments, data processing to identify terminal proximately located to a mobile device may be performed on a server rather than on the mobile device itself.

These and other embodiments are described herein with regard to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, Application Specific Integrated Circuit (ASIC), microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a map of devices and system components deployed in a retail environment, according to an example embodiment. The map is an example of a store 100 having a plurality of aisles, two POS checkout stations 106, 108, and an SST checkout station 102. The store also includes five mobile gateways (MG) 130, 132, 134, 136, 138.

An MG 130, 132, 134, 136, 138 includes a smart controller with pre-loaded software that enables mobile devices to access traditional retail peripherals, such as one or more of scanners, cash drawers, payment terminals, and receipt printers. An MG 130, 132, 134, 136, 138 can also be fitted with a stand to hold a mobile device while serving your customers, although the mobile device need not be fitted to such a stand to interact with and utilize the particular MG 130, 132, 134, 136, 138. A MG 130, 132, 134, 136, 138 generally offer a small-footprint that can be conveniently and unobtrusively placed throughout the store 100 to handle transactions and service customer needs beyond just a mobile device alone. As such, the MGs 130, 132, 134, 136, 138 are deployed through the store 100, such as on the ends of some aisles. MGs are available from NCR Corporation of Duluth, Ga.

The store 100 also includes a network (not illustrated) that connects devices deployed throughout and utilized within the store. The network may include wired connections to terminals (i.e., POS checkout stations 106 and 108, SST checkout station 102, and MGs 130, 132, 134, 136, 138) and wireless access points (WAPs) 112, 114 that may be utilized to connect one or more of the terminals and mobile devices 152, 154 that may be utilized in a roaming manner throughout the store.

Also deployed throughout the store 100 are beacon devices 104, 110, 120, 122, 124, 126, 128 of a positioning system. Some of the beacon devices, such as beacon devices 120 and 124, may be standalone devices that are deployable at any location within the store 100. Some other beacon devices may be integrated within or coupled to a terminal or other deployed device, such as beacon devices 104, 110, 122, 126, and 128 that are each integrated within or coupled to an SST, POS, or MG terminal.

In some embodiments, the beacon devices 104, 110, 120, 122, 124, 126, 128 broadcast a signal with an encoded data element that is unique to each respective beacon device 104, 110, 120, 122, 124, 126, 128. These unique codes may be added to a store 100 computing system (not illustrated) that may be present in the store or elsewhere or accessible via another network such as the Internet that may be connected to the store network. Each code added to such a system may then be associated with zero to many terminals that are in proximity to the respective beacon device 104, 110, 120, 122, 124, 126, 128. For example, a unique code of the beacon device 122 may be associated in stored data with both MGs 130 and 132. Similarly, a unique code of beacon device 126 may be registered with MG 126 as well as POS checkout stations 106 and 108. The associations of the beacon device 104, 110, 120, 122, 124, 126, 128 codes to terminals may also include data representative of peripheral devices connected to and functions possible on each of the terminals This data may be stored in a file, a database, or other data structure or data management system. This data may also be included in a mobile device 152, 154 app, a configuration thereof, or otherwise stored on a mobile device 152, 154 for access when needed.

In some embodiments, a beacon device 104, 110, 120, 122, 124, 126, 128 may include a copy of this association data as may be sent to the respective beacon device 104, 110, 120, 122, 124, 126, 128 over a wired or wireless network connection or otherwise stored to a memory device thereof. One or more of the beacon devices 104, 110, 120, 122, 124, 126, 128 may broadcast a form of this data encoded in its broadcast signal. This broadcast data may include data representative of the terminals and their capabilities that are proximate to the particular beacon device 104, 110, 120, 122, 124, 126, 128. However, in other embodiments, a mobile device 152, 152 may cause a transceiver device thereof to broadcast a request signal when terminal data is needed during the course of a payment transaction process requesting the terminal data from any beacon devices 104, 110, 120, 122, 124, 126, 128 that receive the broadcast.

In some embodiments, identifying terminals proximately located to a mobile device 152, 154 may also evaluate signal strength, such as the strength of a Bluetooth® Low Energy (BLE) signal. The signal strength may be considered on one or both of the mobile device 152, 154 and beacon device 104, 110, 120, 122, 124, 126, 128. Due to the nature of signaling, such as radio frequency signaling, a determined distance is typically not an actual distance, but rather a relative or approximate distance between a mobile device and a positioning system device. Thus, a distance may be assumed based on the strength of signal in view of one or more signal strength thresholds of a mobile device, beacon device, or other process that identifies terminals proximately located to a mobile device. In some such embodiments, the signal strength consideration may operate as a filter when many signals are received, such as by the mobile device 152. The mobile device may receive a signal from the beacon device 122 and from the beacon device 110. The signal from the beacon device 122 will likely be strong as the beacon device 122 is in relatively close proximity to the mobile device 152. At the same time, the signal received from the beacon device 110 will be of a lower signal strength when received due at least to the greater distance between the beacon device 110 and the mobile device 152. Thus, based not only on the received beacon device 110, 122 signals, but also on the strength of these received signals, terminal options presented, suggested, or automatically chosen by an app on the mobile device 152 or other process that may execute on a different device or server, may filter out the beacon device 110 from consideration as it is not in close proximity to the mobile device 152. Accordingly, even when the mobile device 152 is able to receive signals from a particular beacon device, the signal strength consideration provides a mechanism through which more distant terminals may be removed from consideration.

Regardless of the particular mode of locating terminals proximate to a location of a mobile device 152, 154 as a clerk or customer roams throughout the store 100, data with regard to the proximate terminals is received by the app of the mobile device 152, 154.

In some embodiments, rather than or in addition to using one or more beacon devices 104, 110, 120, 122, 124, 126, 128 of a positioning system, WAPs 112, 114 may be utilized. An identifier of a WAP 112, 114 may be an internet protocol (IP) address or other data that may be included in headers or elsewhere within data packets transmitted by the WAPs 112, 114. Thus, when a mobile device 152, 154 is connected to a particular WAP 112, 114, the identifying data of the WAP 112, 114 may be identified within one or more packets. The WAP 112, 114 identifying data may be registered and associated with the various terminals and distributed to the mobile devices 152, 154 similarly to the registration of the beacon device 104, 110, 120, 122, 124, 126, 128 unique codes.

Figure 2:
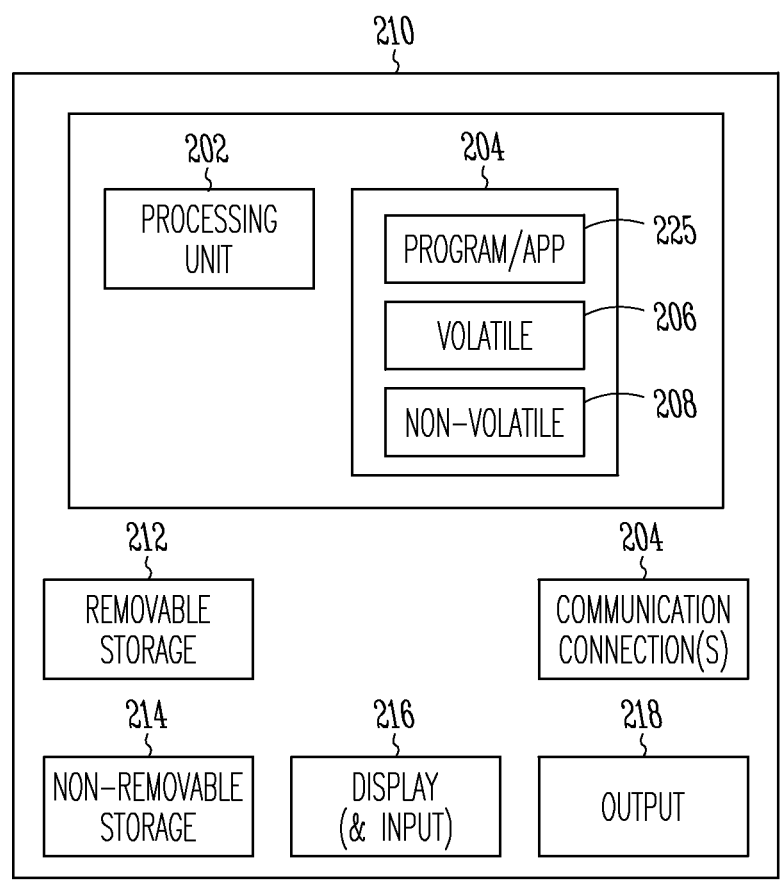
FIG. 2 is a logical block diagram of mobile device, according to an example embodiment.

FIG. 2 is a logical block diagram of mobile device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a mobile device 210 may include a processing unit 202, memory 204, and non-removable storage 214. In some embodiments, the mobile device 210 may also include removable storage 212. The mobile device 210, in various embodiments, may be a tablet, a smartphone, a handheld computing device (e.g., an iPod device available from Apple, Inc. of Cupertino, Calif. or other handheld computing device on which apps or other forms of software can be installed and executed). Although the example computing device is illustrated and described as a mobile device 210, the computing device may be in different forms in different embodiments. For example, the computing device may instead be a mobile or laptop computer, a tablet/laptop hybrid device, a custom developed device, or device including the same or similar elements as illustrated and described with regard to FIG. 2. Further, although the various data storage elements are illustrated as part of the mobile device 210, the storage may also or alternatively include cloud-based storage accessible via a network, such as the Internet.

Returning to the mobile device 210, memory 204 may include volatile memory 206 and non-volatile memory 208. Mobile device 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies and non-transitory computer readable mediums. Mobile device 210 may include or have access to a computing environment that includes a display 216 that may also include an input such as a touchscreen, output 218, and a communication connection 220.

The mobile device 210 may also include or be wire or wirelessly coupled to one or more of a touchpad, trackpad, mouse, keyboard, camera, barcode scanner, bankcard (e.g., credit card, debit card, gift card, etc.) reader, and other input devices. The output 218 may include one or more audio output devices such as speaker and a headphone jack, a tactile output device (i.e., a device that causes the mobile device 210 to provide a vibratory signal), one or more LED lights, a receipt printer, among others depending on the particular embodiment. These various outputs 218 may be integrated as a part of the mobile device 210 or coupled, wired or wirelessly, thereto.

The mobile device 210 typically operates in a networked environment using one or more communication connections 220 to connect to or receive broadcast data from positioning devices and one or more remote computers such as terminals (e.g., POS, SST, and MG terminals as illustrated and described with regard to FIG. 1), database servers, web servers, and other computing devices. The one or more communication connections may include one or more radio transceiver devices, such as one or more of a Wi-Fi® communication device, a Bluetooth® communication device, a mesh network communication device, a mobile network communication device (i.e., a network operated by a company that may be referred to as a mobile carrier such as Verizon Wireless® or AT&T®), and the like.

Computer-readable instructions stored on a computer-readable medium are executable by the processing unit 202 of the mobile device 210, such as may be stored in the memory 204. For example, various computer programs 225 or apps, such as one or more apps, applications, and modules implementing one or more of the methods illustrated and described herein or an app or application that executes on a mobile device or is accessible via a web browser, may be stored on a non-transitory computer-readable medium of the mobile device 210.

One such app stored in the memory of the mobile device 210 is a payment transaction processing app that may be utilized by a store clerk or customer to scan products via an input as described above or select products or services from a present listing of products and services to generate a bill of sale. The app may further receive input with regard to other portions of a payment transaction, such as a mobile payment account identifier and password, bankcard information that may be read by a bankcard reader or input by the user, receive a signature with a user interface presented on a touchscreen, and the like. Such a mobile device 210 app also operates to identify a terminal capable of performing one or more payment processing functions that are unsupported by the mobile device 210 and app, such as printing a receipt, receiving a cash payment, among others as described elsewhere herein and as would be readily apparent to one having ordinary skill in the art. The mobile device 210 app may also pre-stage a transaction to be completed at or on a terminal that may be similarly identified. When more than one terminal is identified in such embodiments, selectable terminal options may be provided or a terminal may be automatically selected by the app or a service or process that executes on a different computing device, such as a terminal or networked server. The mobile device 210 app may then transmit the relevant data to the terminal, either directly or via a networked data processing infrastructure support payment processing transactions.

Figure 3:
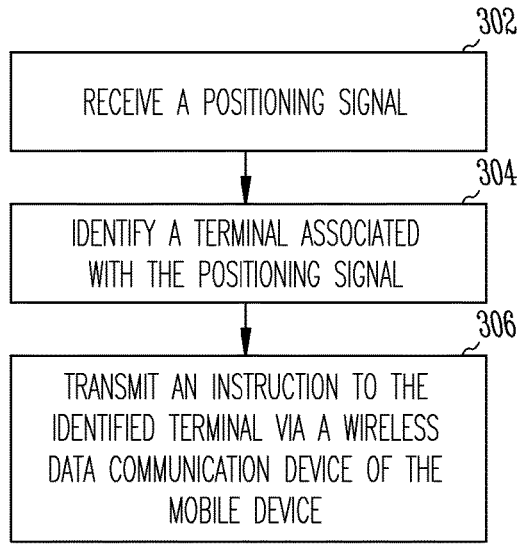
FIG. 3 is a block flow diagram of a method, according to an example embodiment.

FIG. 3 is a block flow diagram of a method 300, according to an example embodiment. The method 300 is an example of a process that may be executed on a mobile device, in whole or in part, as part of a platform or operating system service of a mobile device that may be provided as one or more functions callable by mobile device apps. In other embodiments, the method 300 is an example of a process that may be performed in whole or in part by an app that executes on a mobile device. In other embodiments, the method 300 is performed in part by one or more mobile device platform or operating system services and in part by a process that is part of a mobile device app. In yet further embodiments, the method 300 may be performed on a mobile computer such as a laptop in whole, in part, by one or both of an application and operating system service.

The method 300 includes receiving 302 a positioning signal. The positioning signal may be received from a radio, ultrasonic, infrared, or other type of beacon device in various embodiments. The method 300 further includes identifying 304 a terminal associated with the positioning signal and transmitting 306 an instruction to the identified terminal via a wireless data communication device of the mobile device, such as a Wi-Fi®, Bluetooth®, or other wireless data communication device that may be present on the mobile device.

In some embodiments of the method 300, receiving 302 the positioning signal includes receiving a radio signal from a beacon device deployed at a facility location. In such embodiments, the received 302 radio signal includes data encoded therein that is an index into stored data representative of terminals associated with the positioning signal.

In another embodiment of the method 300, the identifying 304 and transmitting 306 are performed by at least one process of a transaction processing app stored on a memory device and executed by at least one processor of the mobile device. In some such embodiments, receiving 302 the positioning signal includes receiving a plurality of positioning signals from a plurality of beacon devices deployed at different facility locations. When a plurality of positioning signals are received 302, identifying 304 the terminal associated with the positioning signal includes identifying terminals with regard to each of the received positioning signals. In such embodiments, the method 300 may further include providing, within a user interface of the transaction processing app, an option to select one of the identified terminals to which the instruction will be transmitted 306.

Some such embodiments may further include the transaction processing app identifying peripheral devices connected to the identified terminal and modifying transaction processing options within the transaction processing app based on the peripheral devices identified as connected to the identified terminal. One transaction processing option may be with regard to types of payment that may be presented, such as cash, credit card and the like based on peripheral devices integrated within and coupled to the terminal.

Modifying the transaction processing options within the transaction processing app may include providing an option to transfer a purchase transaction from the transaction processing app to the identified terminal (e.g., pre-staging as discussed above). In such embodiments of the method 300, the transmitting 306 of the instruction to the identified terminal includes transmitting purchase transaction data from the transaction processing app and an instruction to take over the purchase transaction to the identified terminal. This data may be transmitted from the mobile device to the identified terminal either directly via a network, via a peer-to-peer connection as may be established on an ad hoc basis via Bluetooth® or other radio transceiver devices equally present on the mobile device and identified terminal, via a server, or otherwise depending on the embodiment and the communication infrastructure thereof.

Figure 4:
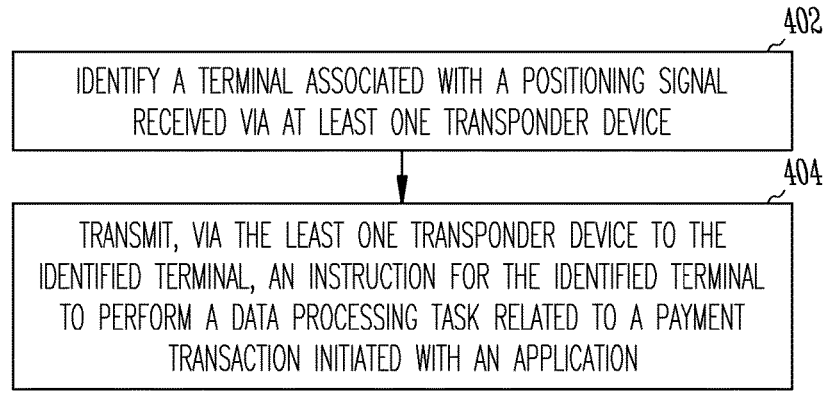
FIG. 4 is a block flow diagram of a method, according to an example embodiment.

FIG. 4 is a block flow diagram of a method 400, according to an example embodiment. The method 400 is another example of a process that may be executed on a mobile device in similar arrangements between a mobile device app and mobile device platform or operating system processes and mobile or laptop computer operating system processes or software.

In some embodiments, the method 400 includes identifying 402 a terminal associated with a positioning signal received via at least one transceiver device of the computing device. The method 400 further includes transmitting, via the least one transceiver device to the identified terminal, an instruction for the identified terminal to perform a data processing task related to a payment transaction initiated with an application that executes on a device performing the method 400. In some embodiments, the positioning signal is received and the instruction is transmitted via a single transceiver device.

Another embodiment is in the form of a mobile device, such as a tablet, smartphone, or similar device-type. The mobile device includes at least one data communication transceiver device, at least one processor and at least one memory device. The memory device stores instructions executable by the at least one processor to process a positioning signal received via the at least one data communication transceiver device to identify at least one terminal associated with the positioning signal. The instructions are further executable to receive user input into and provide a view on a display of the mobile device with regard to a payment transaction initiated thereon. The mobile device may further receive an input command to perform a payment transaction function that is not supported on the mobile device but is supported on the identified terminal. The instructions are further executable in such circumstances to transmit a command and any data needed to carry out the command via the data communication transceiver device to the identified terminal.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed on a mobile device, the method comprising:
   receiving a positioning signal;
   identifying a terminal associated with the positioning signal;
   transmitting an instruction to the identified terminal via a wireless data communication device of the mobile device,
   wherein the identifying and transmitting are performed by at least one process of a transaction processing app stored on a memory device and executed by at least one processor of the mobile device and wherein the method further includes
      determining, by the transaction processing app, peripheral devices connected to the identified terminal; and
      modifying transaction processing options within the transaction processing app based on the peripheral devices determined as connected to the identified terminal, including providing an option to transfer a purchase transaction from the transaction processing app to the identified terminal, and transmitting an instruction to the identified terminal includes transmitting purchase transaction data from the transaction processing app and an instruction to take over the purchase transaction to the identified terminal.

2. The method of claim 1, wherein:
   receiving the positioning signal includes receiving a radio signal from a beacon device deployed at a facility location; and
   the received radio signal includes data encoded therein that is an index into stored data representative of terminals associated with the positioning signal.

3. The method of claim 1, wherein:
   receiving a positioning signal includes receiving a plurality of positioning signals from a plurality of beacon devices deployed at different facility locations;
   identifying the terminal associated with the positioning signal includes identifying terminals with regard to each of the received positioning signals; and
   the method further comprising:
      providing, within a user interface of the transaction processing app, an option to select one of the identified terminals to which the instruction will be transmitted.

4. The method of claim 1, wherein providing transaction processing options includes an option with regard to at least one form of payment that maybe accepted with the transaction.

5. The method of claim 1, wherein determining peripheral devices connected to the identified terminal includes retrieving data representative of the peripheral devices via the wireless data communication device from a networked data store based at least in part on data encoded in the received positioning signal.

6. The method of claim 1, wherein the positioning signal is received via the wireless communication device.

7. The method of claim 6, wherein the wireless communication device is a Bluetooth® device.

* * * * *